United States Patent
Asfour et al.

(10) Patent No.: US 11,579,697 B2
(45) Date of Patent: Feb. 14, 2023

(54) HAPTIC EFFECT ENCODING AND RENDERING SYSTEM

(71) Applicant: IMMERSION CORPORATION, San Francisco, CA (US)

(72) Inventors: Shadi Asfour, Montreal (CA); Eric Gervais, Montreal (CA); Hugues-Antoine Oliver, Montreal (CA); Eric Lajeunesse, Montreal (CA)

(73) Assignee: IMMERSION CORPORATION, San Francisco, CA (US)

( * ) Notice: Subject to any disclaimer, the term of this patent is extended or adjusted under 35 U.S.C. 154(b) by 105 days.

(21) Appl. No.: 17/329,222

(22) Filed: May 25, 2021

(65) Prior Publication Data

US 2021/0278903 A1    Sep. 9, 2021

Related U.S. Application Data

(63) Continuation of application No. 15/668,125, filed on Aug. 3, 2017, now abandoned.

(51) Int. Cl.
| | |
|---|---|
| *G06F 3/01* | (2006.01) |
| *G06F 3/16* | (2006.01) |
| *G06F 9/50* | (2006.01) |
| *G06F 3/00* | (2006.01) |
| *H04N 21/432* | (2011.01) |
| *H04N 21/2387* | (2011.01) |
| *H04N 21/8547* | (2011.01) |
| *G08B 6/00* | (2006.01) |

(52) U.S. Cl.
CPC .............. *G06F 3/016* (2013.01); *G06F 3/005* (2013.01); *G06F 3/165* (2013.01); *G06F 9/50* (2013.01); *H04N 21/2387* (2013.01); *H04N 21/4325* (2013.01); *H04N 21/8547* (2013.01); *G08B 6/00* (2013.01)

(58) Field of Classification Search
CPC .......... G06F 3/016; G06F 3/005; G06F 3/165; G06F 9/50; G08B 6/00
See application file for complete search history.

(56) References Cited

U.S. PATENT DOCUMENTS

| | | |
|---|---|---|
| 6,963,762 B2 | 11/2005 | Kaaresoja et al. |
| 8,619,051 B2 | 12/2013 | Lacroix et al. |
| 9,367,136 B2 | 6/2016 | Latta et al. |
| 9,370,459 B2 | 6/2016 | Mahoney |
| 9,370,704 B2 | 6/2016 | Marty |
| 9,392,094 B2 | 7/2016 | Hunt et al. |
| 9,462,262 B1 | 10/2016 | Worley, III et al. |
| 9,626,805 B2 | 4/2017 | Lampotang et al. |
| 9,645,646 B2 | 5/2017 | Cowley et al. |
| 9,652,037 B2 | 5/2017 | Rubin et al. |
| 9,760,166 B2 | 9/2017 | Ammi et al. |
| 9,811,854 B2 | 11/2017 | Lucido |

(Continued)

Primary Examiner — Nabil H Syed
Assistant Examiner — Cal J Eustaquio
(74) Attorney, Agent, or Firm — Nath, Goldberg & Meyer; Jerald L. Meyer; Gregory B. Kang (57) ABSTRACT

The embodiments of the present invention enable novel methods, non-transitory mediums, and systems for encoding and generating haptic effects. According to the various embodiments, a media object is retrieved. The media object is analyzed to determine one or more time periods for rendering haptic effects. The haptic effects for rendering during the time periods are determined. The haptic effects are encoded as a haptic effect pattern that identifies a start time and duration for each of the haptic effects.

20 Claims, 9 Drawing Sheets

(56) References Cited

U.S. PATENT DOCUMENTS

| | | |
|---|---|---|
| 9,851,799 B2 | 12/2017 | Keller et al. |
| 9,933,851 B2 | 4/2018 | Goslin et al. |
| 9,948,885 B2 | 4/2018 | Kurzweil |
| 9,997,032 B2 | 6/2018 | Lacroix et al. |
| 2003/0166405 A1 | 9/2003 | Jauk et al. |
| 2009/0096632 A1 | 4/2009 | Ullrich et al. |
| 2010/0066512 A1 | 3/2010 | Rank |
| 2014/0002346 A1 | 1/2014 | Weddle et al. |
| 2014/0300454 A1 | 10/2014 | Lacroix et al. |
| 2015/0058722 A1 | 2/2015 | Cruz-Hernandez et al. |
| 2015/0070148 A1 | 3/2015 | Cruz-Hernandez et al. |
| 2016/0070348 A1 | 3/2016 | Cowley et al. |
| 2016/0084605 A1 | 3/2016 | Monti |
| 2016/0086457 A1 | 3/2016 | Baron et al. |
| 2016/0163227 A1 | 6/2016 | Penake et al. |
| 2016/0166930 A1 | 6/2016 | Brav et al. |
| 2016/0169635 A1 | 6/2016 | Hannigan et al. |
| 2016/0170508 A1 | 6/2016 | Moore et al. |
| 2016/0171860 A1 | 6/2016 | Hannigan et al. |
| 2016/0171908 A1 | 6/2016 | Moore et al. |
| 2016/0187969 A1 | 6/2016 | Larsen et al. |
| 2016/0187974 A1 | 6/2016 | Mallinson |
| 2016/0201888 A1 | 7/2016 | Ackley et al. |
| 2016/0209658 A1 | 7/2016 | Zalewski |
| 2016/0214015 A1 | 7/2016 | Osman et al. |
| 2016/0214016 A1 | 7/2016 | Stafford |
| 2016/0345073 A1 | 11/2016 | Phan et al. |
| 2016/0375170 A1 | 12/2016 | Kursula et al. |
| 2017/0102771 A1 | 4/2017 | Lei |
| 2017/0103574 A1 | 4/2017 | Faaborg et al. |
| 2017/0131775 A1 | 5/2017 | Clements |
| 2017/0148281 A1 | 5/2017 | Do et al. |
| 2017/0154505 A1 | 6/2017 | Kim |
| 2017/0168576 A1 | 6/2017 | Keller et al. |
| 2017/0168773 A1 | 6/2017 | Keller et al. |
| 2017/0178407 A1 | 6/2017 | Gaidar et al. |
| 2017/0203221 A1 | 7/2017 | Goslin et al. |
| 2017/0203225 A1 | 7/2017 | Goslin |
| 2017/0206709 A1 | 7/2017 | Goslin et al. |
| 2017/0214782 A1 | 7/2017 | Brinda |
| 2017/0257270 A1 | 9/2017 | Goslin et al. |
| 2017/0352185 A1 | 12/2017 | Bonilla Acevedo et al. |
| 2018/0050267 A1 | 2/2018 | Jones |
| 2018/0053351 A1 | 2/2018 | Anderson |
| 2018/0077976 A1 | 3/2018 | Keller et al. |
| 2018/0081436 A1 | 3/2018 | Keller et al. |
| 2018/0093181 A1 | 4/2018 | Goslin et al. |
| 2018/0107277 A1 | 4/2018 | Keller et al. |
| 2018/0120936 A1 | 5/2018 | Keller et al. |

Fig. 4C
430

| 432 Time | 433 Duration | 434 Pattern (Duration/Strength) |
|---|---|---|
| 0 | 110 | {(20, 0.5), (20, 0.0), (20, 1.0), (40, 0.5), (30, 1.0)} |

431

HAPTIC EFFECT ENCODING AND RENDERING SYSTEM

CROSS-REFERENCE TO RELATED APPLICATION

This application is a continuation of U.S. patent application Ser. No. 15/668,125, filed on Aug. 3, 2017.

FIELD OF INVENTION

The embodiments of the present invention are generally directed to electronic devices, and more particularly, to electronic devices that encode and render haptic effects.

BACKGROUND

Electronic device manufacturers strive to produce a rich interface for users. Conventional devices use visual and auditory cues to provide feedback to a user. In some interface devices, kinesthetic feedback (e.g., active and resistive force feedback) and/or tactile feedback (e.g., vibration, texture, temperature variation, and the like) are provided to the user. In general, such feedback is collectively known as "haptic feedback" or "haptic effects." Haptic feedback provides cues that intuitively enhance and simplify a user's interaction with an electronic device. For example, the haptic effects may provide cues to the user of the electronic device to alert the user to specific events, or provide realistic feedback to generate greater sensory immersion within a simulated or virtual environment.

Haptic feedback has also been increasingly incorporated in a variety of portable electronic devices, such as cellular telephones, smart phones, tablets, portable gaming devices, and a variety of other portable electronic devices. In addition, some known devices modify or generate haptic effects in real-time or based on an audio file.

SUMMARY OF THE INVENTION

Embodiments of the present invention are directed toward electronic devices configured to produce haptic effects that substantially improve upon the related art.

Features and advantages of the embodiments are set forth in the description which follows, or will be apparent from the description, or may be learned by practice of the invention.

In one example, the methods, non-transitory mediums, and systems for encoding and generating haptic effects include retrieving a media object, analyzing the media object to determine one or more time periods for rendering haptic effects, determining the haptic effects for rendering during the time periods, encoding the haptic effects as a haptic effect pattern that identifies the start time and duration of each of the haptic effects, and rendering the haptic effects according to the haptic pattern.

It is to be understood that both the foregoing general description and the following detailed description are exemplary and explanatory and are not intended to limit the invention to the described examples.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments. Wherever possible, like reference numbers will be used for like elements.

The embodiments of the present invention enable novel methods, non-transitory mediums, and systems for rendering haptic effects. According to the various embodiments, a haptic effect pattern is used to identify one or more haptic effects according to a variety of haptic parameters. In particular, the haptic effect pattern ignores haptic-free periods. As a result, more efficient use of device resources is provided. For example, the embodiments reduce processor computations and power consumption.

Figure 1:
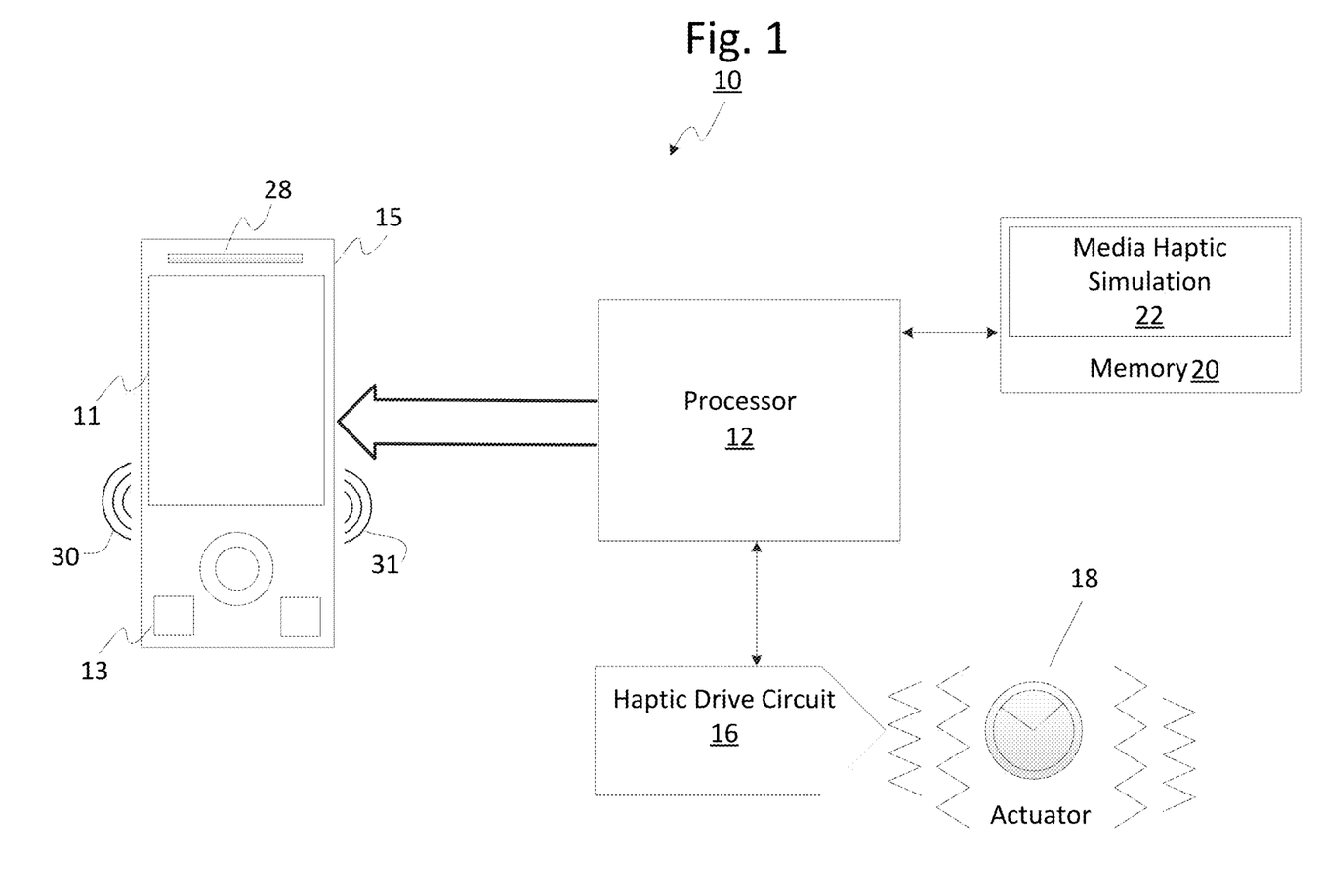
FIG. 1 is a simplified block diagram of a haptically-enabled system/device according to an example embodiment of the present invention.

FIG. 1 is a simplified block diagram of a haptically-enabled system/device 10 according to an example embodiment of the present invention.

System 10 includes a touch sensitive surface 11, such as a touchscreen, or other type of user interface mounted within a housing 15, and may include mechanical keys/buttons 13 and a speaker 28. Internal to system 10 is a haptic feedback system that generates haptic effects on system 10 and includes a processor 12. Coupled to processor 12 is a memory 20, and a haptic drive circuit 16 which is coupled to an actuator 18 or other haptic output device.

Processor 12 can determine which haptic effects are rendered and the order in which the haptic effects are rendered based on an encoded haptic effect pattern. In general, the haptic effect pattern defines one or more haptic rendering time periods for each haptic effect. In particular, the haptic effect pattern tracks and stores the start time and duration for each haptic effect. Additional high level parameters, such as the magnitude, frequency, and type of haptic effect may also be specified. A haptic effect may be considered "dynamic" if it includes some variation of these parameters when the haptic effect is rendered or a variation of these parameters based on a user's interaction. Examples of such dynamic effects include ramp-up, ramp-down, spatial, and other haptic effects. The haptic feedback system, in one embodiment, generates vibrations 30, 31 or other types of haptic effects on system 10.

Processor 12 outputs the control signals to haptic drive circuit 16, which includes electronic components and circuitry used to supply actuator 18 with the required electrical current and voltage (i.e., "motor signals") to render the desired haptic effects. System 10 may include more than one actuator 18 or other haptic output device, and each actuator may include a separate drive circuit 16, all coupled to a common processor 12.

Haptic drive circuit 16 is configured to drive actuator 18. For example, haptic drive circuit 16 may attenuate the haptic drive signal at and around the resonance frequency (e.g., +/−20 Hz, 30 Hz, 40 Hz, etc.) of actuator 18. In certain embodiments, haptic drive circuit 16 may comprise a variety of signal processing stages, each stage defining a subset of the signal processing stages applied to modify the haptic drive signal.

Processor 12 may be any type of general purpose processor, or could be a processor specifically designed to provide haptic effects, such as an application-specific integrated circuit ("ASIC"). Processor 12 may be the same processor that operates the entire system 10, or may be a separate processor.

Memory 20 may include a variety of computer-readable media that may be accessed by processor 12. In the various embodiments, memory 20 and other memory devices described herein may include a volatile and nonvolatile medium, removable and non-removable medium. For example, memory 20 may include any combination of random access memory ("RAM"), dynamic RAM ("DRAM"), static RAM ("SRAM"), read only memory ("ROM"), flash memory, cache memory, and/or any other type of non-transitory computer-readable medium. Memory 20 stores instructions executed by processor 12. Among the instructions, memory 20 includes media haptic simulation module 22, which are instructions that, when executed by processor 12, generate the haptic effects using actuator 18 in combination with touch sensitive surface 11 and/or speaker 28, and by encoding haptic effects as discussed below. Memory 20 may also be located internal to processor 12, or any combination of internal and external memory.

Actuator 18 may be any type of actuator or haptic output device that can generate a haptic effect. In general, an actuator is an example of a haptic output device, where a haptic output device is a device configured to output haptic effects, such as vibrotactile haptic effects, electrostatic friction haptic effects, temperature variation, and/or deformation haptic effects, in response to a drive signal. Although the term actuator may be used throughout the detailed description, the embodiments of the invention may be readily applied to a variety of haptic output devices. Actuator 18 may be, for example, an electric motor, an electro-magnetic actuator, a voice coil, a shape memory alloy, an electroactive polymer, a solenoid, an eccentric rotating mass motor ("ERM"), a harmonic ERM motor ("HERM"), a linear resonance actuator ("LRA"), a solenoid resonance actuator ("SRA"), a piezoelectric actuator, a macro fiber composite ("MFC") actuator, a high bandwidth actuator, an electroactive polymer ("EAP") actuator, an electrostatic friction display, an ultrasonic vibration generator, or the like. In some instances, the actuator itself may include a haptic drive circuit.

In addition to, or in place of, actuator 18, system 10 may include other types of haptic output devices (not shown) that may be non-mechanical or non-vibratory devices such as devices that use electrostatic friction ("ESF"), ultrasonic surface friction ("USF"), devices that induce acoustic radiation pressure with an ultrasonic haptic transducer, devices that use a haptic substrate and a flexible or deformable surface or shape changing devices and that may be attached to a user's body, devices that provide projected haptic output such as a puff of air using an air jet, etc.

In general, an actuator may be characterized as a standard definition ("SD") actuator that generates vibratory haptic effects at a single frequency. Examples of an SD actuator include ERM and LRA. By contrast to an SD actuator, a high definition ("HD") actuator or high fidelity actuator such as a piezoelectric actuator or an EAP actuator is capable of generating high bandwidth/definition haptic effects at multiple frequencies. HD actuators are characterized by their ability to produce wide bandwidth tactile effects with variable amplitude and with a fast response to transient drive signals.

System 10 may be any type of portable electronic device, such as a cellular telephone, personal digital assistant ("FDA"), smartphone, computer tablet, gaming console, remote control, or any other type of device that includes a haptic effect system that includes one or more actuators. In multiple actuator configurations, respective haptic effect patterns may be linked with each of the actuators. System 10 may be a wearable device such as wrist bands, headbands, eyeglasses, rings, leg bands, arrays integrated into clothing, etc., or any other type of device that a user may wear on a body or can be held by a user and that is haptically enabled, including furniture or a vehicle steering wheel. Further, some of the elements or functionality of system 10 may be remotely located or may be implemented by another device that is in communication with the remaining elements of system 10.

Figure 2:
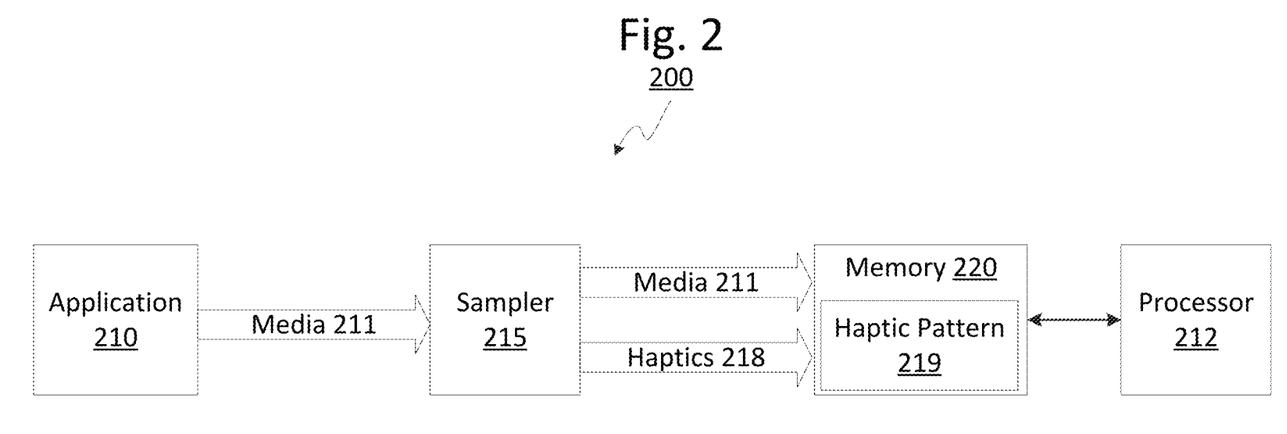
FIG. 2 is a simplified block diagram illustrating a system for generating a haptic pattern according to an example embodiment of the present invention.

FIG. 2 is a simplified block diagram illustrating a system 200 for generating a haptic pattern according to an example embodiment of the present invention.

As shown in FIG. 2, processor 212 may execute various programs, such as an application 210. As part of its functionality, application 210 generates media objects including audio and/or video streams, such as media stream 211. Media stream 211 may be sampled, by sampler 215 or alternatively by processor 212, to generate haptic streams, such as haptic stream 218. For example, a 40 second media stream 211 may be sampled at a predetermined rate, such as 200 samples per second. As a result, the example 40 second media stream 211 is represented by 8000 sampled values. In conventional systems, a haptic value is assigned to each of the 8000 sampled values of media stream 211. In turn, each of the 8000 assigned haptic values, including null values, is processed by such conventional systems. Although a wide variety of haptic effects may be generated from audio, an excessive amount of processing power is required. Excessive use of the processer can reduce significantly reduce the battery life span of portable electronic devices.

By contrast, in embodiments of the present invention, processor 212 converts or encodes haptic stream 218 into a haptic effect pattern 219 by analyzing the sampled values or waveforms of media stream 211. In particular, haptic effect pattern 219 is used to identify the start time and duration of each haptic effect. By identifying the start time of each haptic effect, processor 212 needs only to process the haptic effects during haptically-active time periods. As a result, processor 212 may disengage from processing haptic effects when no haptic effects are scheduled for rendering. For example, if haptic effect pattern 219 corresponds to a media stream 211 having a duration 10 seconds, and includes a haptic effect that starts at a time of 9 seconds with a duration of 1 second, then processor 212 may begin to process and render the haptic effect at the start time of the haptic effect, that is 9 seconds, and during the haptic effect duration, which is 1 second.

In addition to reducing the load of processor 212, haptic effect pattern 219 may be stored in memory 220 instead of haptic stream 218. As a result, memory usage within memory 220 is reduced. Haptic effect pattern 219 also may specify other haptic parameters, such as haptic effect type, magnitude, frequency, etc. In some instances, processor 212 also may adjust the start times and durations of the haptic effects to provide either synchronous or asynchronous haptic effects.

In an alternative embodiment, haptic data, such as haptic stream 218, may be incorporated directly within media stream 211. Such a configuration enables the connection of haptic objects to virtual reality objects in the media object. For example, the haptic intensity or magnitude may be varied depending on the user's distance from a virtual reality object. In such virtual reality contexts, a 360 degree view may be split into a plurality of haptic tracks that are rendered simultaneously while muting the ones not in the view of the user. Depending on the user's location or view, haptic tracks may be mixed together to give a more accurate haptic representation. In another alternative embodiment, the haptic effect pattern may be predetermined and transmitted to the electronic device.

Figure 3:
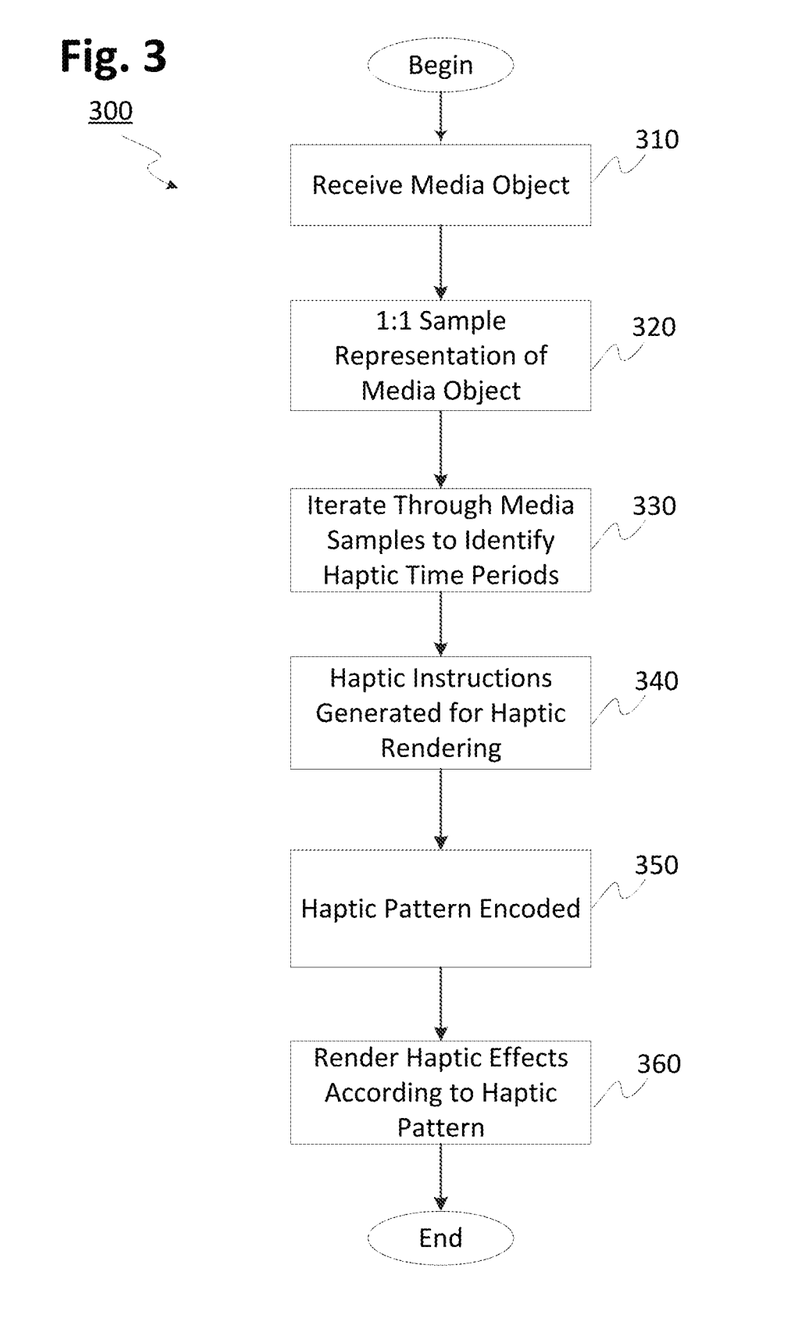
FIG. 3 illustrates a flow diagram of a functionality for encoding and rendering haptic effects based on a haptic effect pattern according to an example embodiment of the present invention.

FIG. 3 illustrates a flow diagram of a functionality 300 for encoding and rendering haptic effects based on a haptic effect pattern according to an example embodiment of the present invention. In some instances, the functionality of the flow diagram of FIG. 3 is implemented by software stored in memory or other computer readable or tangible media, and executed by a processor. In other instances, the functionality may be performed by hardware (e.g., through the use of an application specific integrated circuit ("ASIC"), a programmable gate array ("PGA"), a field programmable gate array ("FPGA"), etc.), or any combination of hardware and software.

At 310, functionality 300 receives one or more media objects as input. The media objects may include one or more audio, video, other media files (e.g., animation objects), or any combination thereof. The media object may include predetermined media objects or media objects rendered "on the fly" based on actions of a user (e.g., within a gaming application).

Next, at 320, functionality 300 samples the media object to generate a haptic object, such as a haptic stream. Typically, the media object is sampled at a predetermined rate, such as 200 samples per second. For example, a 40 second media object may be sampled at 200 samples per second. In this example, the 40 second media object may be represented by 8000 sample values. As in conventional systems, a haptic value is assigned to each of the 8000 sample values of the media object.

At 330, functionality 300 iterates through the media object to identify time periods suitable for rendering haptic effects. Here, the sampled values or the wave form of the media object is analyzed to identify one or more haptically-relevant events. For example, the tempo of the media object may indicate that weak or strong haptic effects should be rendered (e.g., weaker haptic effects when slow, stronger haptic effects when fast). Alternatively, or additionally, the haptic effects may be selected depending on other events (e.g., crash, explosion, etc.) detected within the media object.

Subsequently, at 340, one or more haptic instructions are generated for rendering haptic effects. Based on the analysis of the media object, at 330, one or more haptic instructions are generated to cause haptic effects to be rendered by one or more haptic output devices (e.g., actuator 18 of FIG. 1). For example, the haptic instructions may cause haptic effects to be retrieved from a haptic library.

At 350, functionality 300 encodes the haptic object as a haptic pattern. In particular, the embodiments of the present invention store, within the haptic pattern, the haptic effect start times, durations, and effect data. For example, if the haptic pattern corresponds to media object having a duration 10 seconds, and includes a haptic effect that starts at a time of 9 seconds with a duration of 1 second, then the data segment of the haptic pattern specifies the start time of the haptic effect, that is 9 seconds, the haptic effect duration, which is 1 second, and the effect data, which is a 1 second of haptic pattern data.

Although .hapt files (a haptic file type from Immersion Corp.) may be utilized in conjunction with the embodiments of the present invention, the file size of the .hapt files are substantially reduced. Here, only haptically-active time periods are stored and time periods without haptic effects are not stored or otherwise processed. Other parameters, such as frequency, magnitude, and haptic effect type also may be stored within the haptic effect pattern.

Lastly, at 360, functionality 300 renders the haptic effects according to the haptic effect pattern. Once the haptic effect pattern is encoded in the hapt file, it may be used to render haptic effects. Using the haptic pattern, the haptic effects are rendered by scheduling events to occur at the assigned start times of the haptic effects. Once the haptic effects are triggered, the haptic effect pattern is used to render the haptic effects. Returning to the previous example, the haptic output is scheduled to occur at 9 seconds after rendering the haptic file. In other words, after 9 seconds, the processor fetches the haptic instruction and renders the corresponding haptic effects.

Figure 4A:
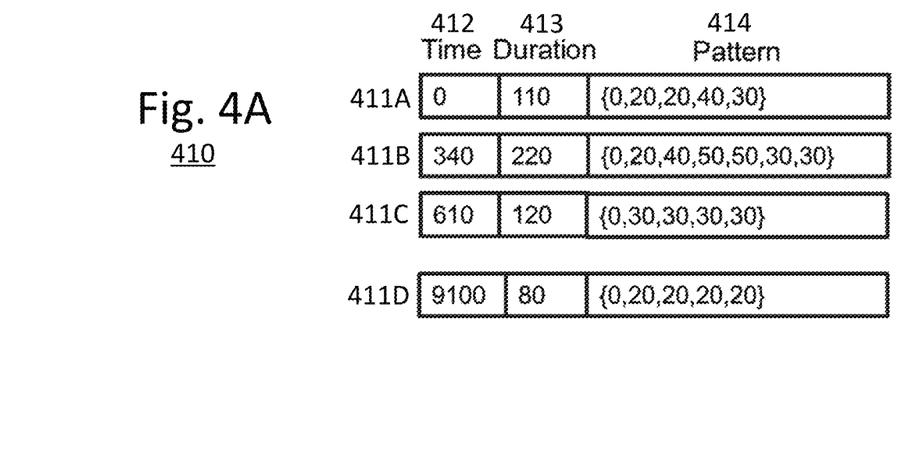
FIGS. 4A-4C illustrate a haptic effect pattern and haptic effect timeline according to example embodiments of the present invention.
Figure 4B:
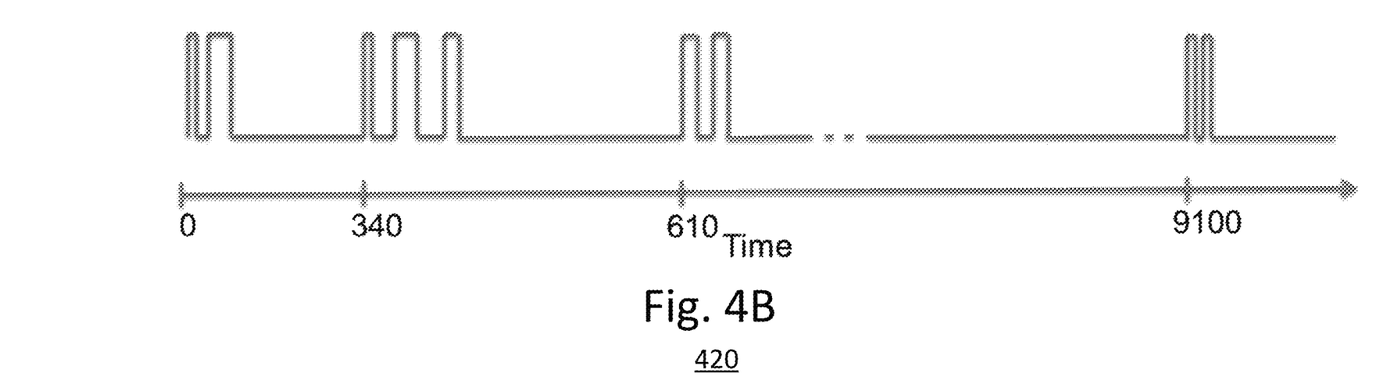
Figure 4C:
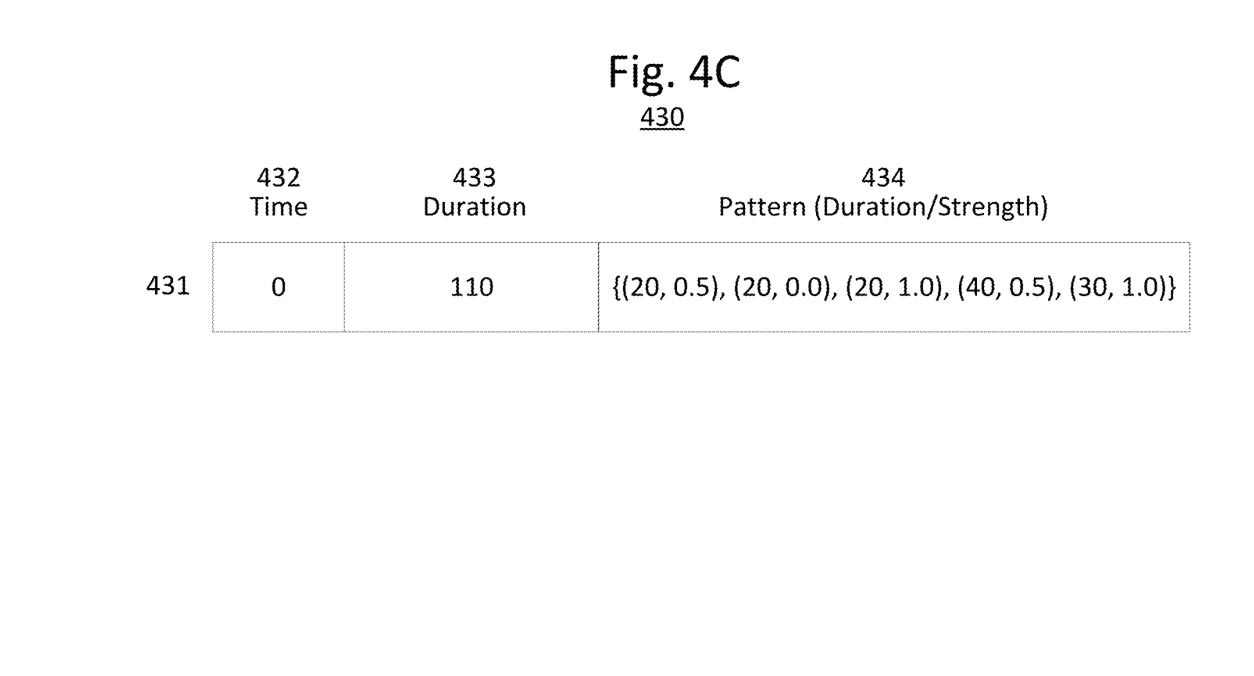

FIGS. 4A-4C illustrate a haptic effect pattern 410, 430 and a haptic effect timeline 420 according to example embodiments of the present invention.

As shown in FIG. 4A, example haptic effect pattern 410 includes a list of haptic effects 411A-D, and a plurality of corresponding fields for each haptic effect including time field 412, duration field 413, and pattern field 414. Haptic effects 411A-D may be stored in a list that is sorted by start time (e.g., start times 0, 340, 610, and 9100), as indicated within time field 412. Optional duration field 413 indicates the total duration of the pattern stored within corresponding pattern field 414. Duration field 413 may be used to more readily provide more advanced or dynamic haptic effects, such as ramp-up, ramp down, and spatial haptic effects. Pattern field 414 includes the duration times for alternating actuator OFF and actuator ON time periods.

When each haptic effect 411A-D is triggered (i.e., the start time of the respective haptic effect 411A-D is reached), the corresponding pattern field 414 is rendered at the target haptic output device (e.g., actuator 18 of FIG. 1). In this example, starting at time 0 seconds, the pattern for haptic effect 411A is OFF for 0 seconds, ON for 20 seconds, OFF for 20 seconds, ON for 40 seconds, and OFF for 30 seconds.

The pattern for haptic effect 411B, starting at time 340 seconds, is OFF for 0 seconds, ON for 20 seconds, OFF for 40 seconds, ON for 50 seconds, OFF for 50 seconds, ON for 30 seconds, and OFF for 30 seconds. The pattern for haptic effect 411C, starting at time 610 seconds, is OFF for 0 seconds, ON for 30 seconds, OFF for 30 seconds, ON for 30 seconds, and OFF for 30 seconds. The pattern for haptic effect 411D, starting at time 9100 seconds, is OFF for 0 seconds, ON for 20 seconds, OFF for 20 seconds, ON for 20 seconds, and OFF for 20 seconds.

FIG. 4B illustrates a haptic effect timeline 420 of the haptic effects rendered according to haptic effect pattern 410. In other words, the haptic effect timeline 420 visually represents haptic effect pattern 410 which is depicted in FIG. 4A.

Although ON/OFF patterns are described above, alternative configurations are also feasible. For example, duration/strength patterns also can be used. As shown in FIG. 4C, example haptic effect pattern 430 includes haptic effect 431, and a plurality of corresponding fields for each haptic effect including time field 432, duration field 433, and pattern field 434. Pattern field 434 includes the duration times and corresponding strengths for the actuator. In this example, starting at time 0 seconds, the pattern for haptic effect 431 is strength of 0.5 (e.g., half strength) for 20 seconds, strength of 0 (i.e., OFF) for 20 seconds, strength of 1.0 (e.g., full strength) for 20 seconds, strength of 0.5 for 40 seconds, and strength of 1.0 for 30 seconds.

Figure 5:
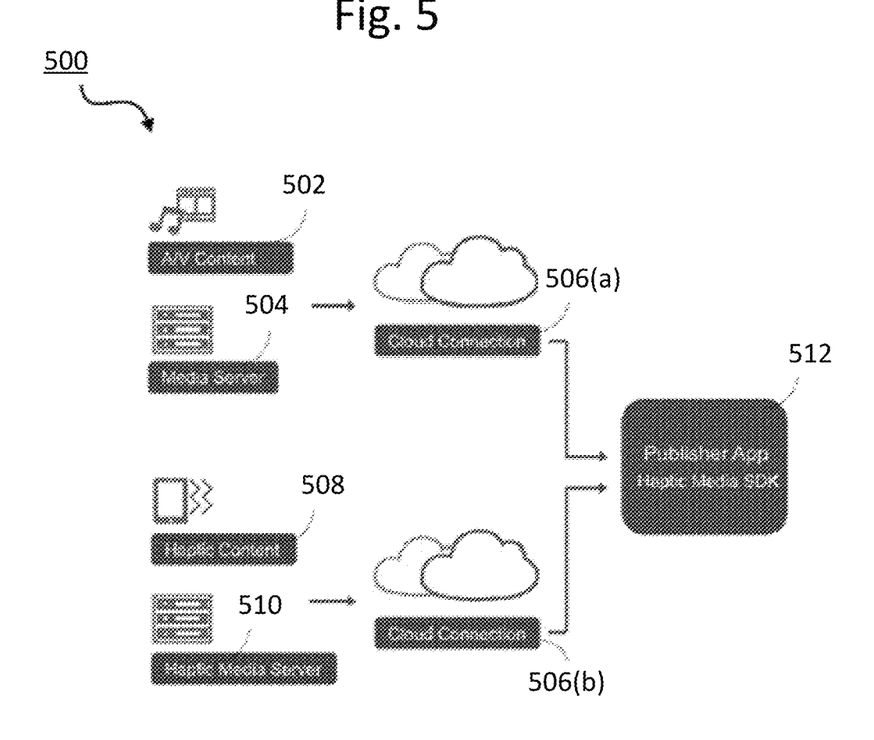
FIG. 5 illustrates a system environment for generating and rendering haptic feedback according to an example embodiment of the present invention.

Turning now to FIG. 5, embodiments for a system environment for generating and rendering haptic feedback are provided. As shown in FIG. 5, a system 500 includes a media object 502 stored on one or more media server(s) 504 and haptic instructions 508, such as a haptic library, stored on one or more haptic media server(s) 510. As shown in system 500, each of media server(s) 504 and haptic media server(s) 510 may include one or more server(s) with standard components known in the art, e.g., processor, memory, data storage, network connection(s), and software configured to store and access data stored on the server. Both the media server(s) 504 and the haptic media server(s) 510 are coupled to one of cloud or Internet connections 506(a) or 506(b). Although shown as separate servers, media server(s) 504 and haptic media server(s) 510 may be configured as part of a single server. Connections 506(a) or 506(b) comprise wired and/or wireless internet connections as is known in the art.

As shown in system 500, media object 502 may be transmitted separately from haptic instructions 508. As described above, haptic instructions 508 may be retrieved from a haptic library after one or more haptic effects are identified and/or otherwise assigned to media object 502. An application, such as a publisher application 512 (e.g., a haptic-enabled Android application or haptic media software development kit ("SDK")), may be accessed to synchronize and/or otherwise render the media and haptic objects.

The embodiments may be configured to be used in conjunction with a variety of SDKs and other products for implementing haptic effects on electronic devices. Examples of such SDKs and other products include Immersion's TouchSense Force SDK, Immersion Video SDK ("IVSDK"), Asynchronous Haptic Media SDK ("AHMSDK"), Aurora SDK, Unified Haptic Library ("UHL"), and JavaScript Player.

As discussed above, the haptic effect pattern may include a list of haptic effects for rendering in conjunction with the rendering of corresponding media objects. Upon execution of the media object, the haptic effect objects are generated for each haptic effect listed in the haptic effect pattern. In other words, multiple haptic effect objects may be stored or otherwise referenced within a linked list. For example, the haptic effect pattern may reference a haptic effect object at 530 ms, and reference another haptic effect object at 800 ms. The haptic effects objects are executed sequentially and proceed to iterate through the linked list. Then, the embodiments move to the next effect in the linked list. Subsequently, the second effects vibration pattern is executed, and so on. Although a linked list is described as an example implementation, other configurations are readily feasible including software arrays, queues, double linked lists, and the like.

When the rendering of the media object is requested, the embodiments of the present invention call one or more executable modules to generate and execute the haptic effect pattern. Here, the embodiments start tracking the reference time at which the rendering of the media object was requested, and the elapsed time of the media object. The reference time is the current time (typically described in milliseconds), while the elapsed time is the time that has passed since the beginning of the haptic effect. The reference time is updated whenever an action (e.g., play or pause) is applied to the haptic effect. For example, when a pause function is selected, the elapsed time is calculated as: elapsed time=current time−reference time. The elapsed time is also used in connection with update and seek functions.

By using the variables described herein, such as the elapsed time and the reference time, the timing of the haptic effects may be more accurately rendered. This enables both synchronous and asynchronous haptic playback. Using the haptic effect pattern, and the time variables, asynchronous playback is achieved. For synchronous playback, the actual times at which playback is requested, resumed, or updated as well as the elapsed time and the reference time are used.

Haptic effects contained within the haptic effect pattern also may be scheduled and rendered according to the following pseudocode which shows the tracking of reference time:

```
//Post time is the time an effect starts relative to its beginning
void startRenderer( ) {
    Node current = hapticEffect.getHeadNode( )
    while (current) {
        mHandler.postDelayed(mRunnable, current.getPattern( ).getPostTime( ));
        current = current.getNext( );
    }
    mEffect.setReferenceTime(getCurrentTimeInMS( ));
    mIsRunning = true;
}
```

Figure 6:
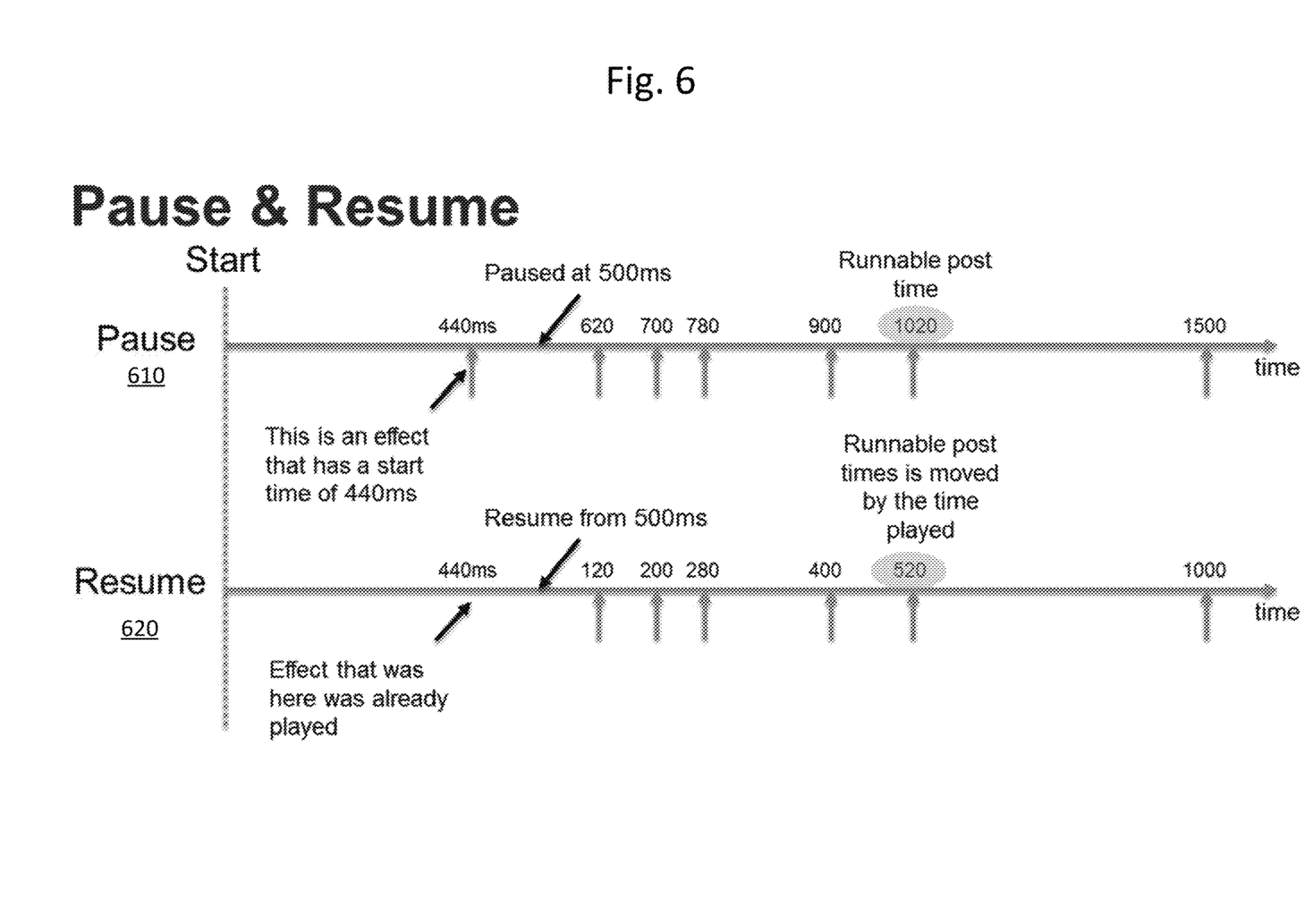
FIG. 6 illustrates haptic effect timelines of haptic effects rendered according to a haptic effect pattern according to an example embodiment of the present invention.

FIG. 6 illustrates timelines of haptic effects rendered according to a haptic effect pattern according to an example embodiment of the present invention. In particular, FIG. 6 depicts pause timeline 610 and resume timeline 620 which relate to the pausing and resuming of media objects and their corresponding haptic objects. When the media object is paused, each executable module, media and haptic, may be removed from the processing queue. In the example depicted in FIG. 6, the media object and corresponding haptic objects are paused and further removed from the processing queue at time 500 ms.

Based on the execution of the pause function, the elapsed time variable is updated to the render time of the media object. In addition, a running variable is set to FALSE when the media object is paused. Subsequently, if the resume function is selected, the execution times of the haptic objects are offset by the elapsed time. The running variable is also set to TRUE. For example, if the pause function is selected at time 500 ms which is in advance of the haptic object scheduled to be executed at time 620 ms, then the execution time of the haptic object is offset by the elapsed time of 500 ms. Accordingly, once the resume function is selected, the haptic object executes at time 120 ms (620 ms-500 ms).

The pause and resume functionality may be implemented according to the following psuedocode:

```
void pauseRenderer( ) {
    mHandler.remove(mRunnable); //remove all scheduled runnables
    mEffect.setElapsedTime(mEffect.getElapsedTime( ) +
(getCurrentTimeInMS( ) - mEffect.getReferenceTime( )));
    mIsRunning = false;
}
void resumeRenderer( ) {
    Node current = mNode;
    while (current) {
        mHandler.postDelayed(mRunnable, current.getPattern( ).
        getPostTime( )-
            current.getPattern( ).getElapsedTime( ));
        current = current.getNext( );
    }
    mEffect.setReferenceTime(getCurrentTimeInMS( ));
    mIsRunning = true;
}
```

Figure 7:
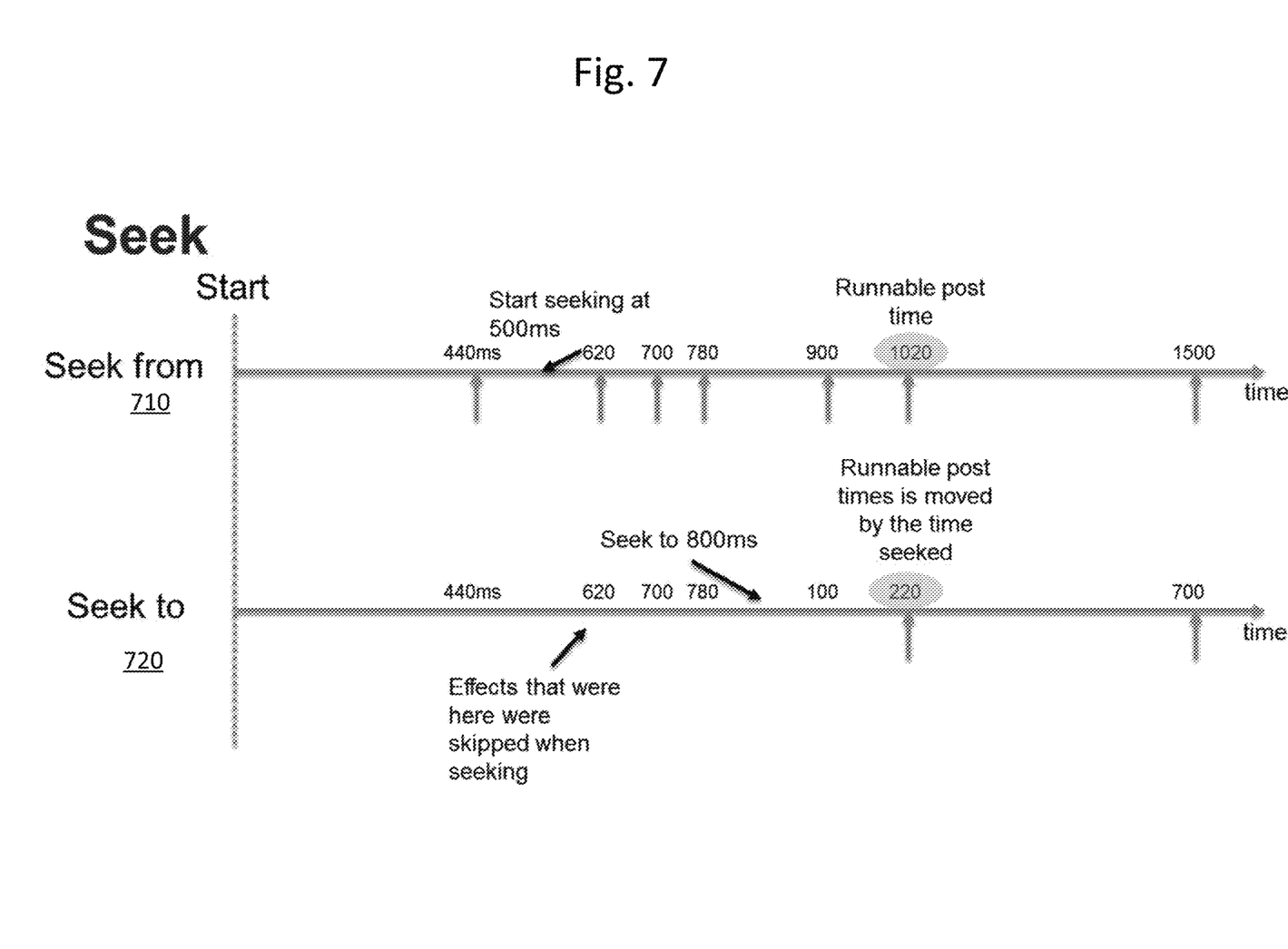
FIG. 7 illustrates timelines of haptic effects rendered according to a haptic effect pattern according to another example embodiment of the present invention.

FIG. 7 illustrates timelines of haptic effects rendered according to a haptic effect pattern according to another example embodiment of the present invention. In particular, FIG. 7 depicts seek origin timeline 710 and seek target timeline 720 which relate to the seeking function that enables a user to scroll through the timeline of media objects and their corresponding haptic objects. When the seeking functionality is executed, the user selects to seek from a first point of the media object, say 500 ms, to a second point in the media object, say 800 ms, as shown.

To achieve the seeking functionality, each executable module may be removed from the processing queue. In the example depicted in FIG. 7, the seeking function is called at 500 ms, and any subsequent media object rendering and corresponding haptic objects are paused and further removed from the processing queue at time 500 ms. Subsequently, when the user selects a target time, 800 ms in the example shown in FIG. 7, then the seeking functionality resets the elapsed time based on the selected target time and further determines which haptic objects remain to be executed.

The seeking functionality may be implemented according to the following psuedocode:

```
void seekRenderer(long positionMS) {
    mEffect.setElapsedTime(positionMS); //update expected position
    if (mIsRunning) {
        mHandler.remove(mRunnable);
    }
    Node current = mHead;
    while (!correspondsToSeekedPosition(current)) {
        current = current.getNext( );
    }
    mNode = current;
    mEffect.setElapsedTime(positionMS);
}
```

Figure 8:
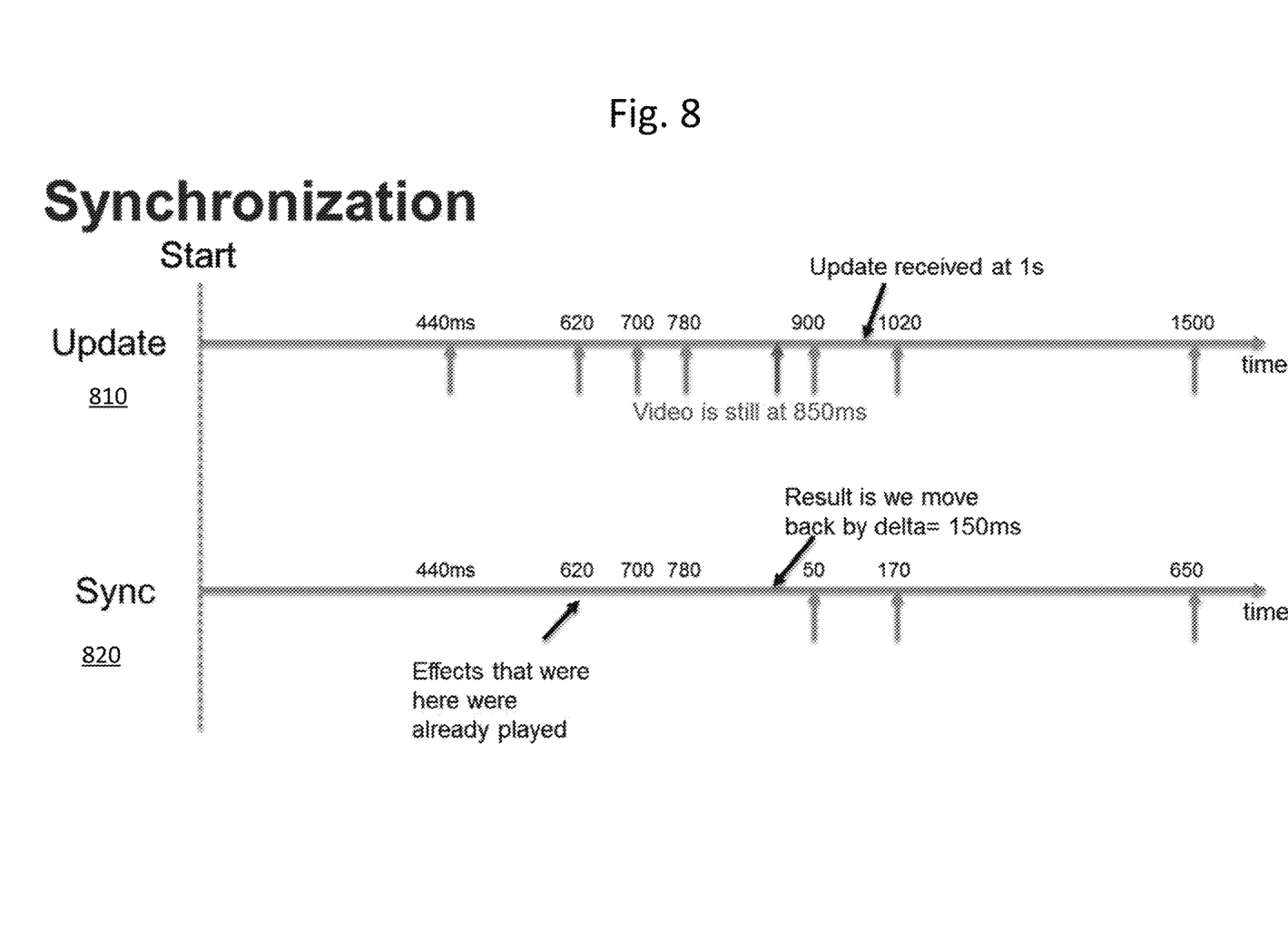
FIG. 8 illustrates timelines of haptic effects rendered according to a haptic effect pattern according to yet another example embodiment of the present invention.

FIG. 8 illustrates a timeline of haptic effects rendered according to a haptic effect pattern according to yet another example embodiment of the present invention. During the rendering of media and haptic objects, a misalignment between the media and haptic effects may occur. For example, slow network connections, lost media frames, and other events may cause such misalignments.

As shown in FIG. 8, the haptic objects may be realigned with the corresponding media object. In an example implementation, the embodiments may periodically call an application programming interface ("API") to update the current time. Such updates may occur every 1.5 seconds, for example. In turn, the embodiments may calculate a time delta between the media object and the reference time, and compare the time delta to a predetermined threshold. In the event that the time delta exceeds the predetermined threshold, then the user may sense that the haptic effects are out of sync with the media object. In addition, the synchronization functionality is executed. In the example depicted in FIG. 8, the API is called and it is determined that the reference time is 1 second, but that the media object is still at 850 ms. In this example, the time delta of 150 ms (1 s-850 ms) is greater than the predetermined threshold which may be 100 ms. In turn, the elapsed time of the haptic object is offset by the time delta.

The synchronization functionality may be implemented according to the following psuedocode:

```
void updateRenderer(long positionMS) {
    mEffect.setElapsedTime(mEffect.getElapsedTime( ) +
(getCurrentTimeInMS( ) - mEffect.getReferenceTime( )));
    long delta = mEffect.getElapsedTime( ) - positionMS;
    if (delta > THRESHOLD || delta < -THRESHOLD) {
        mHandler.remove(mRunnable);
        mEffect.setElapsedTime(positionMS);
        Node current = mNode;
        while (current) {
            mHandler.postDelayed(mRunnable,
    current.getPattern( ).getPostTime( )
            —    mEffect.getElapsedTime( ));
            current = current.getNext( );
        }
    }
    mEffect.setReferenceTime(getCurrentTimeInMS( ));
}
```

Thus, the example embodiments described herein provide more efficient techniques for encoding, rendering, and manipulating haptic effects. According to the various embodiments, a haptic effect pattern is used to identify one or more haptic effects according to a variety of haptic parameters. Additionally, the haptic effect pattern ignores haptic-free periods (i.e., silent periods). As a result, the embodiments reduce processor computations and power consumption.

Several embodiments have been specifically illustrated and/or described. However, it will be appreciated that modifications and variations of the disclosed embodiments are covered by the above teachings and within the purview of the appended claims without departing from the spirit and intended scope of the invention. The embodiments described herein are only some of the many possible implementations. Furthermore, the embodiments may be readily applied to various actuator types and other haptic output devices.

We claim:

1. A method for generating haptic effects, the method comprising:
    retrieving a media object;
    generating a haptic stream for storing haptic effects, the haptic stream corresponding to the media object;
    encoding the haptic effects of the haptic stream as a haptic effect pattern;

engaging a processor to render the haptic effects of the haptic stream according to the haptic effect pattern;

determining an elapsed time for each of the haptic effects, wherein the elapsed time represents a time that has passed since initiation of rendering of the corresponding one of the haptic effects;

selectively initiating a pause function, wherein the pause function updates the elapsed time for each of the haptic effects to correspond to a render time of the media object;

selectively initiating a resume function, wherein the resume function updates an execution time of each of the haptic effects by offsetting the execution time by the corresponding elapsed time;

selectively initiating a seeking function, wherein the seeking function stops the rendering of the haptic effects of the haptic stream, receives a selected target time, resets the elapsed time of each of the haptic effects based on the selected target time, and resumes rendering of the haptic effects of the haptic stream according to the haptic effect pattern; and disengaging the processor from processing the haptic stream according to the haptic effect pattern.

2. The method for generating haptic effects according to claim 1, wherein the haptic effect pattern identifies a start time and a duration of each of the haptic effects.

3. The method for generating haptic effects according to claim 2, further comprising:
analyzing the media object to determine one or more time periods for rendering the haptic effects; and
determining the haptic effects for rendering during the one or more time periods.

4. The method for generating haptic effects according to claim 1, wherein the haptic effect pattern includes one or more parameters for each of the haptic effects, the parameters being selected from the group consisting of magnitude, frequency and type of haptic effect.

5. The method for generating haptic effects according to claim 1, wherein the media object includes an audio object or a video object.

6. The method for generating haptic effects according to claim 1, wherein the haptic effect pattern only includes data relating to haptically-active time periods.

7. The method for generating haptic effects according to claim 1, wherein the haptic effect pattern includes a plurality of duration times that indicate alternating actuator OFF and actuator ON time periods.

8. The method for generating haptic effects according to claim 1, wherein the media object and the haptic effect pattern are synchronized.

9. The method for generating haptic effects according to claim 1, wherein the haptic stream further stores a start time and duration for each of the haptic effects stored therein.

10. A device for generating haptic effects, comprising:
a processor; and
a memory storing one or more programs for execution by the processor, the one or more programs including instructions for:
retrieving a media object;
generating a haptic stream for storing haptic effects, the haptic stream corresponding to the media object;
encoding the haptic effects of the haptic stream as a haptic effect pattern;
engaging a processor to render the haptic effects of the haptic stream according to the haptic effect pattern;
determining an elapsed time for each of the haptic effects, wherein the elapsed time represents a time that has passed since initiation of rendering of the corresponding one of the haptic effects;

selectively initiating a pause function, wherein the pause function updates the elapsed time for each of the haptic effects to correspond to a render time of the media object;

selectively initiating a resume function, wherein the resume function updates an execution time of each of the haptic effects by offsetting the execution time by the corresponding elapsed time;

selectively initiating a seeking function, wherein the seeking function stops the rendering of the haptic effects of the haptic stream, receives a selected target time, resets the elapsed time of each of the haptic effects based on the selected target time, and resumes rendering of the haptic effects of the haptic stream according to the haptic effect pattern; and disengaging the processor from processing the haptic stream according to the haptic effect pattern.

11. The device for generating haptic effects according to claim 10, wherein the one or more programs further include instructions for the haptic effect pattern identifying a start time and a duration of each of the haptic effects.

12. The device for generating haptic effects according to claim 11, wherein the one or more programs further include instructions for:
analyzing the media object to determine one or more time periods for rendering the haptic effects; and
determining the haptic effects for rendering during the one or more time periods.

13. A non-transitory computer readable medium having instructions stored thereon that, when executed by a processor, cause the processor to perform operations comprising:
retrieving a media object;
generating a haptic stream for storing haptic effects, the haptic stream corresponding to the media object;
encoding the haptic effects of the haptic stream as a haptic effect pattern;
engaging a processor to render the haptic effects of the haptic stream according to the haptic effect pattern;
determining an elapsed time for each of the haptic effects, wherein the elapsed time represents a time that has passed since initiation of rendering of the corresponding one of the haptic effects;

selectively initiating a pause function, wherein the pause function updates the elapsed time for each of the haptic effects to correspond to a render time of the media object;

selectively initiating a resume function, wherein the resume function updates an execution time of each of the haptic effects by offsetting the execution time by the corresponding elapsed time;

selectively initiating a seeking function, wherein the seeking function stops the rendering of the haptic effects of the haptic stream, receives a selected target time, resets the elapsed time of each of the haptic effects based on the selected target time, and resumes rendering of the haptic effects of the haptic stream according to the haptic effect pattern; and disengaging the processor from processing the haptic stream according to the haptic effect pattern.

14. The non-transitory computer readable medium according to claim 13, wherein the haptic effect pattern identifies a start time and a duration of each of the haptic effects.

15. The non-transitory computer readable medium according to claim 14, further comprising:
  analyzing the media object to determine one or more time periods for rendering the haptic effects; and
  determining the haptic effects for rendering during the one or more time periods.

16. The non-transitory computer readable medium according to claim 13, wherein the haptic effect pattern includes one or more parameters for each of the haptic effects, the parameters being selected from the group consisting of magnitude, frequency and type of haptic effect.

17. The non-transitory computer readable medium according to claim 13, wherein the haptic effect pattern only includes data relating to haptically-active time periods.

18. The non-transitory computer readable medium according to claim 13, wherein the haptic effect pattern includes a plurality of duration times that indicate alternating actuator OFF and actuator ON time periods.

19. The non-transitory computer readable medium according to claim 13, wherein the media object and the haptic effect pattern are synchronized.

20. The non-transitory computer readable medium according to claim 13, wherein the haptic stream further stores a start time and duration for each of the haptic effects stored therein.

* * * * *